United States Patent
Coleman

(10) Patent No.: US 10,836,359 B2
(45) Date of Patent: Nov. 17, 2020

(54) AUTOMATIC HEATED WIPER SYSTEM

(71) Applicant: Heat N Clean Products, Inc., Brampton (CA)

(72) Inventor: Trent Coleman, Brampton (CA)

(73) Assignee: CRYSTAL CLEAR BLADES INC., Concord (CA)

( * ) Notice: Subject to any disclaimer, the term of this patent is extended or adjusted under 35 U.S.C. 154(b) by 232 days.

(21) Appl. No.: 15/822,602

(22) Filed: Nov. 27, 2017

(65) Prior Publication Data

US 2018/0093643 A1 Apr. 5, 2018

Related U.S. Application Data

(62) Division of application No. 15/704,240, filed on Sep. 14, 2017, now abandoned.
(Continued)

(51) Int. Cl.
*B60S 1/38* (2006.01)
*B60S 1/04* (2006.01)
(Continued)

(52) U.S. Cl.
CPC ........ *B60S 1/3805* (2013.01); *B60H 1/00021* (2013.01); *B60H 1/00028* (2013.01); *B60H 1/2218* (2013.01); *B60H 1/2225* (2013.01); *B60H 1/28* (2013.01); *B60S 1/048* (2013.01); *B60S 1/0477* (2013.01); *B60S 1/0866* (2013.01); *B60S 1/0896* (2013.01); *B62D 25/081* (2013.01); *G01M 15/046* (2013.01); *G01M 15/06* (2013.01); *G01M 15/12* (2013.01); *H05B 1/0236* (2013.01); *B60H 2001/0015* (2013.01); *B60H 2001/00128* (2013.01);
(Continued)

(58) Field of Classification Search
CPC .... B60S 1/3803; B60S 1/3805; B60S 1/0477; B60S 1/048; B60S 1/0866; B60S 1/0896; H05B 3/84; H05B 3/86; H05B 1/0236; H05B 2214/02; H05B 2203/031
USPC .......................... 15/250.06, 250.07; 219/202
See application file for complete search history.

(56) References Cited

U.S. PATENT DOCUMENTS

| 4,603,451 | A | * | 8/1986 | VanSickle | B60S 1/3805 |
| | | | | | 15/250.07 |
| 4,928,345 | A | * | 5/1990 | Meltzer | B60S 1/3805 |
| | | | | | 15/250.06 |
| 5,325,561 | A | * | 7/1994 | Kotlar | B60S 1/3805 |
| | | | | | 15/250.05 |
| 7,721,382 | B2 | | 5/2010 | Malone | |

(Continued)

FOREIGN PATENT DOCUMENTS

| CA | 2740384 | 4/2010 |
| CA | 2803488 | 1/2012 |

(Continued)

*Primary Examiner* — Gary K. Graham
(74) *Attorney, Agent, or Firm* — Heer Law; Christopher D. Heer

(57) ABSTRACT

A wiper system for vehicles is provided. The system includes a heated wiper blade assembly, a heated cowl assembly and a controller. The controller receives input from one or more sensors or systems and causes a power source to provide, reduce or stop power to heating elements in the blade and/or cowl depending upon sensed conditions. At least some components in the assembly comprise thermally conductive polymers. The system provides surprisingly advantageous results in that it is effective for melting and clearing ice and snow with a lower than expected pull on a power source such as a battery.

10 Claims, 5 Drawing Sheets

Related U.S. Application Data

(60) Provisional application No. 62/394,509, filed on Sep. 14, 2016.

(51) Int. Cl.
| | | |
|---|---|---|
| *B60H 1/00* | (2006.01) | |
| *B60H 1/28* | (2006.01) | |
| *B60S 1/08* | (2006.01) | |
| *B62D 25/08* | (2006.01) | |
| *H05B 1/02* | (2006.01) | |
| *B60H 1/22* | (2006.01) | |
| *G01M 15/04* | (2006.01) | |
| *G01M 15/06* | (2006.01) | |
| *G01M 15/12* | (2006.01) | |

(52) U.S. Cl.
CPC ............... *B60H 2001/2228* (2013.01); *B60S 2001/3829* (2013.01)

(56) References Cited

U.S. PATENT DOCUMENTS

| | | | |
|---|---|---|---|
| 8,431,870 | B2 | 4/2013 | Kim et al. |
| 9,003,595 | B2 | 4/2015 | Jones |
| 9,150,197 | B2 | 10/2015 | Wang et al. |
| 9,533,656 | B2 | 1/2017 | Jones |
| 9,815,436 | B2 | 11/2017 | Kleinsasser et al. |
| 10,046,738 | B2 | 8/2018 | Jones |
| 10,077,023 | B2 | 9/2018 | Jones |
| 10,081,336 | B2 | 9/2018 | Jones |
| 2009/0100626 | A1* | 4/2009 | Kim ............... B60S 1/3805 15/250.05 |
| 2017/0048932 | A1* | 2/2017 | Wamsley ............ H05B 1/0236 |

FOREIGN PATENT DOCUMENTS

| | | |
|---|---|---|
| CA | 2789534 | 11/2012 |
| CA | 2883951 | 8/2014 |
| CA | 2883951 A1 * | 8/2014 |
| WO | 2010044768 | 4/2010 |

\* cited by examiner

AUTOMATIC HEATED WIPER SYSTEM

CROSS-REFERENCE TO RELATED APPLICATIONS

This application claims priority to provisional Application No. 62/394,309 filed on Sep. 14, 2014 which is incorporated herein by reference in its entirety.

FIELD OF THE DISCLOSURE

This disclosure relates to wiper blades and related systems and methods.

BACKGROUND OF THE DISCLOSURE

Drivers use wiper blade systems to manage many types of inclement conditions, including heavy rain, sleet, snow and other wintry weather. Wiper blade systems such as those described in U.S. Pat. No. 8,431,870, herein incorporated by reference in its entirety, disclose systems and methods for automatically turning on or turning off heating elements embedded in a wiper blade and a method for controlling the wiper blade.

Drivers seek systems and methods that can minimize the need for manual labor such as scraping ice from windshields. Manufacturers seek systems and methods compatible with autonomous or connected vehicles and related infrastructure and communication protocols. Manufacturers and drivers seek wiper blade systems and methods that maximize effectiveness and minimize the quantity of energy needed to operate. Manufacturers and drivers seek ease of use and repair, and the availability of readily replaceable aftermarket systems.

SUMMARY OF THE DISCLOSURE

Systems disclosed and claimed herein perform at least as well as previously known systems while requiring less power. In some embodiments, the requirement for power can be reduced by at least 10%. In some embodiments, initiation and/or adjustment of power occurs automatically depending upon sensed input. In some embodiments, one or more components are manufactured using one or more plastic materials exhibiting high thermal conductivity.

DETAILED DESCRIPTION OF THE EMBODIMENTS

All figures and examples herein are intended to be non-limiting; they are mere exemplary iterations and/or embodiments of the claims appended to the end of this description. Modifications to structure, materials, the order of steps in procedures, temperature ranges, are contemplated.

Figure 1:
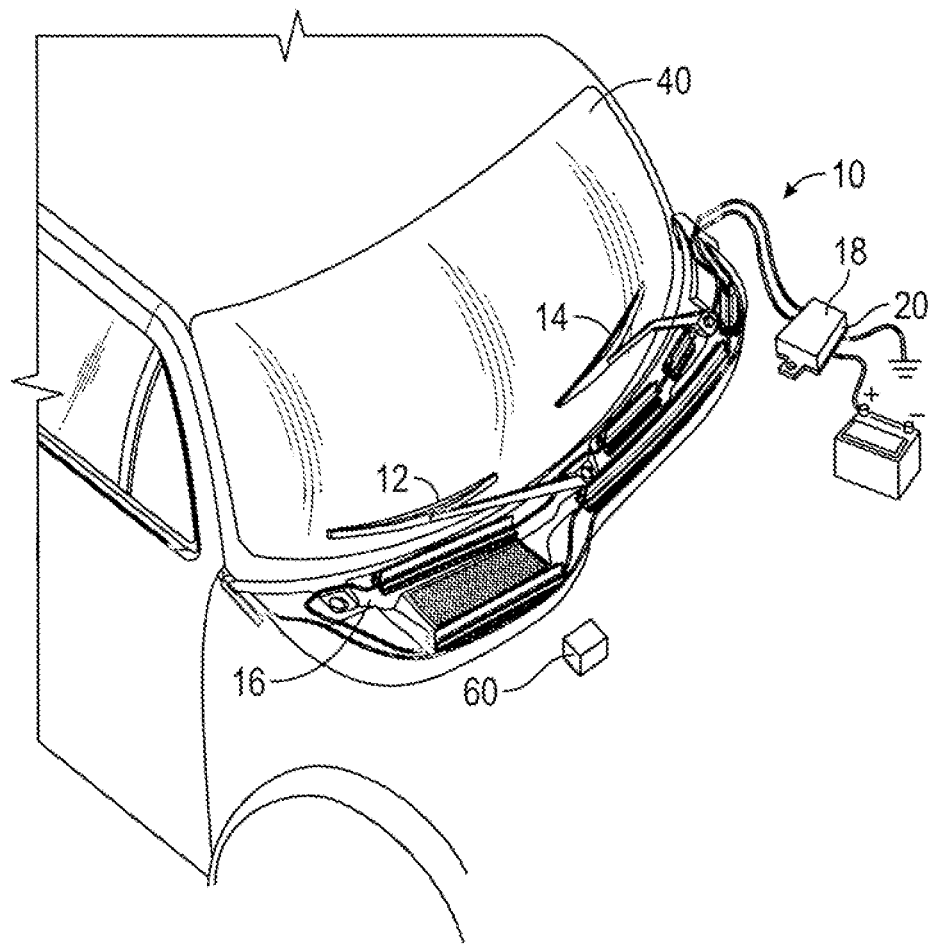
FIG. 1 is an exemplary wiper blade system.

Referring to FIG. 1, an exemplary wiper blade system is shown in connection with a vehicle. The wiper blade system may be used with any of a number of vehicles, including without limitation, the following vehicles; heavy duty, medium duty and light duty trucks (classes 1-8), buses, and automobiles. The vehicles optionally may be made for or retrofitted for, in all in or in part, inclusion in and/or participation with vehicle-to-vehicle (V2V) and vehicle-to-infrastructure (V2I) systems. In one embodiment, the vehicle is an autonomous, self-driving car.

Figure 3:
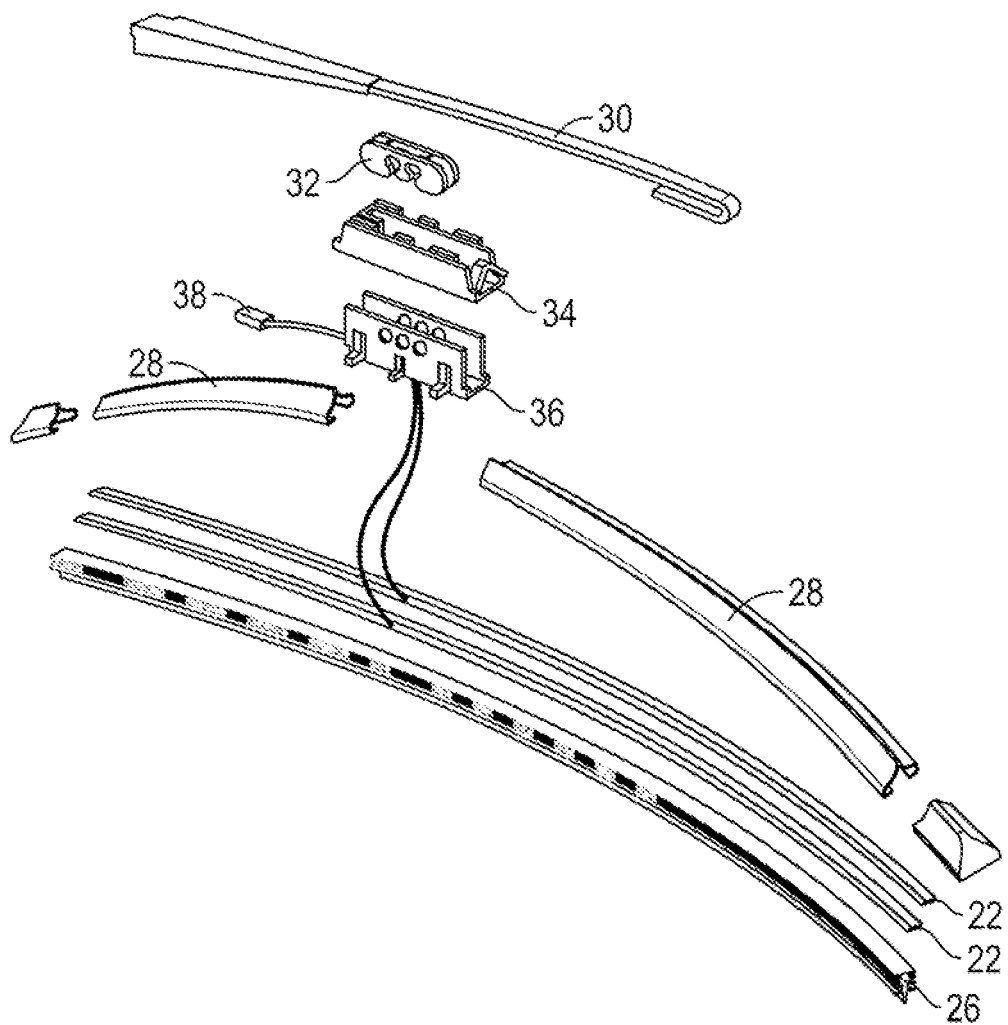
FIG. 3 is an exploded view of a heated wiper blade apparatus.
Figure 4:
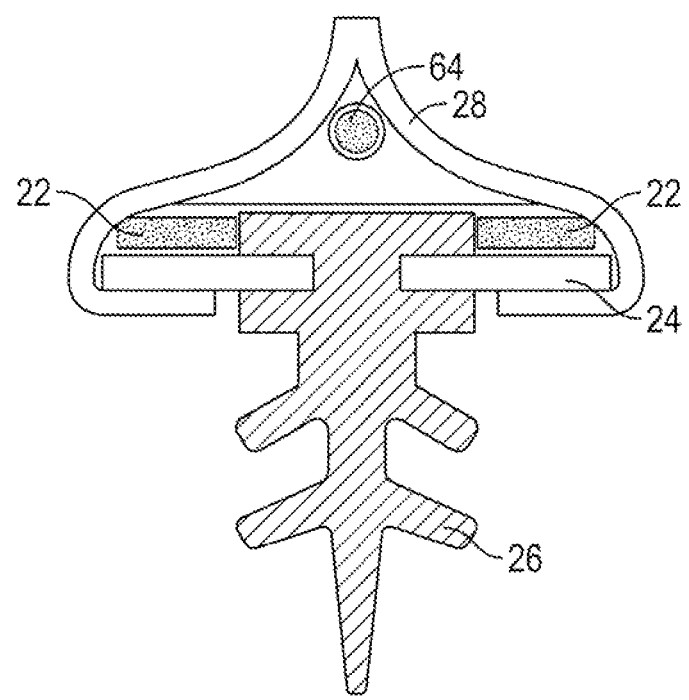
FIG. 4 is a cross-sectional view of a heated wiper blade assembly.

The wiper blade system 10 includes wiper blades 12, 14, a cowl 16, and a controller 18 housed in a module 20. Embodiments are contemplated where the processors reside outside the module and communicate with sensors remotely or through hard wiring. As best seen in the cross-sectional view of FIG. 4, a heated wiper blade assembly 21 includes an electrical, heating element 22, a frame 24 (typically made of metal and configured to hold elastomeric wiper blade or squeegee 26 for mounting within a housing 28), and a squeegee 26 engaged with frame 24 and extending from a housing 28. Shapes and configurations other than that illustrated are contemplated. Other layers could be added outside or inside the housing. The example of FIG. 3 merely assists in illustrating the concepts disclosed herein. The non-limiting example includes a wiper arm 30 for holding and rotationally moving the wiper blade assembly across a windshield, an adapter 32 for connecting the wiper blade assembly to the wiper arm, an adapter housing 34, a bracket 36 with electrical connections 38 to electrical heating element 22, housing 23 and squeegee 26.

In the non-limiting example, heating element 22 is in contact with housing 34 which is in electrical communication with a power source and controller. Heating element 22 may comprise any of a number of conductive materials. By way of non-limiting examples, the heating element may include one or more of copper, aluminum, nichrome alloys including 80/20, iron-chromium-aluminum alloys, copper nickel alloys, ceramics and polymers modified for thermal conductivity. As shown, the wiper blade assembly 21 includes a pair of substantially flat elongated heating elements 22. It is contemplated that heating elements 22 could take on any of a number of shapes, such as to maximize surface area contact with the housing. Without limitation, such shapes may include elongated cylinders, elongated cylinders with an irregular surface or with a surface of bumps (regularly or irregularly placed) that cooperate with complementary shapes in housing 28.

Housing 28, as well as other wiper system components, may include conductive material. In non-limiting embodiments, the housing wiper arm 30, adapter 32, adapter housing 34 and/or bracket 28 can comprise thermally conductive plastics. Polymers and copolymers, especially those that are highly amorphous, typically have a low thermal conductivity—from about 0.11 to about 0.44 W/mK at 25 degrees C. However, additives may be employed to increase thermal conductivity. By way of non-limiting example, such plastics may include polymers, copolymers, polymer blends and or polymer composites including polyamide-6 (PA6), polyamide 6-6 (PA66), poly(acrylonitrile-butadiene-styrene) copolymer (ABS), and others modified to be thermally conductive, such as by inclusion of thermally conductive fillers. Such thermally conductive fillers may include nanoparticles of carbon-based fillers such as graphite, carbon black, carbon nanotubes, pitch-based carbon fiber, copper, aluminum, boron nitride, aluminum nitride, beryllium oxide, others, and combinations of one or more. Thermal conductivity increases noticeably for relatively low conductive filler loading and increases with higher conductive filler loading. However, higher filler loading tends to have a deleterious effect on mechanical properties, such as reduced toughness. Suitable conductive filler loadings can range from about 20% to about 80% by volume in the composite, and more preferably from about 20 or 30% to about 60 or 70%. However, higher or lower loadings are workable. In certain embodiments, the housing 28, wiper arm 30, adapter 32, adapter housing 34 and/or bracket 28 can comprise one or more plastics modified to be thermally conductive including but not limited to polypropylene (PP), liquid crystal polymer (LCP), polyphthalamide (PPA), polyamide (PA), polycarbonate (PC), Polyphenylene sulfide (PPS), and thermoplastic elastomer (TPE), which are commercially available from CoolPlastics of USA in Irvine, Tex. In one exemplary embodiment, the thermal conductivity of the housing may range from a value greater than 100, 200, 300, 400 or 500 W/mK (with, for example, a graphite or aluminum nitride filler) to about 6,000 at 25° C. (with, for example a carbon, nanotube filler).

Heating element 22 may sit on a frame in housing 28 and is in electrical communication with a power source and a controller. Squeegee 26 may comprise one or more of rubber or plastic. Embodiments are contemplated where the squeegee also comprises thermally conductive material. In such embodiments, the thermally conductive material may be the same or different from the thermally conductive material of the housing.

Figure 2A:
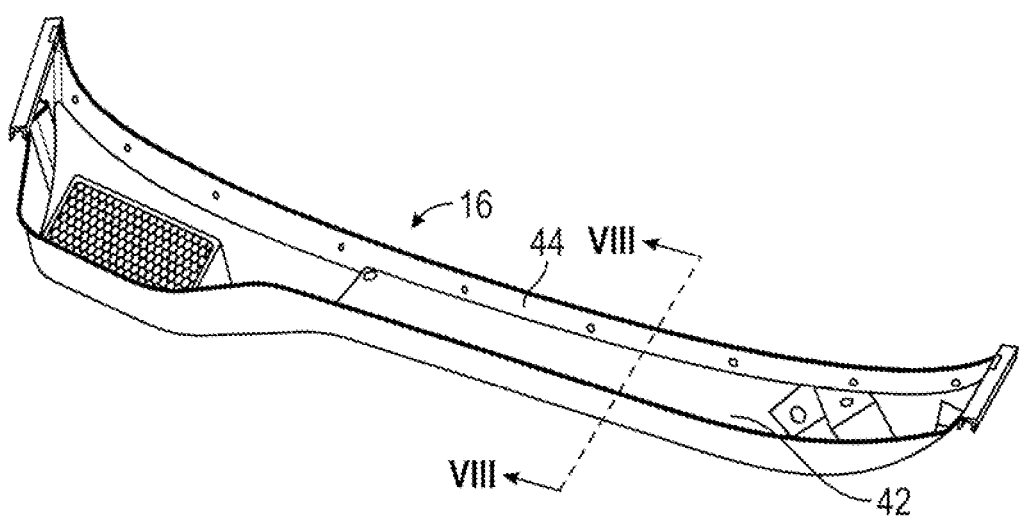
FIG. 2A shows components of an exemplary wiper blade system.
Figure 2B:
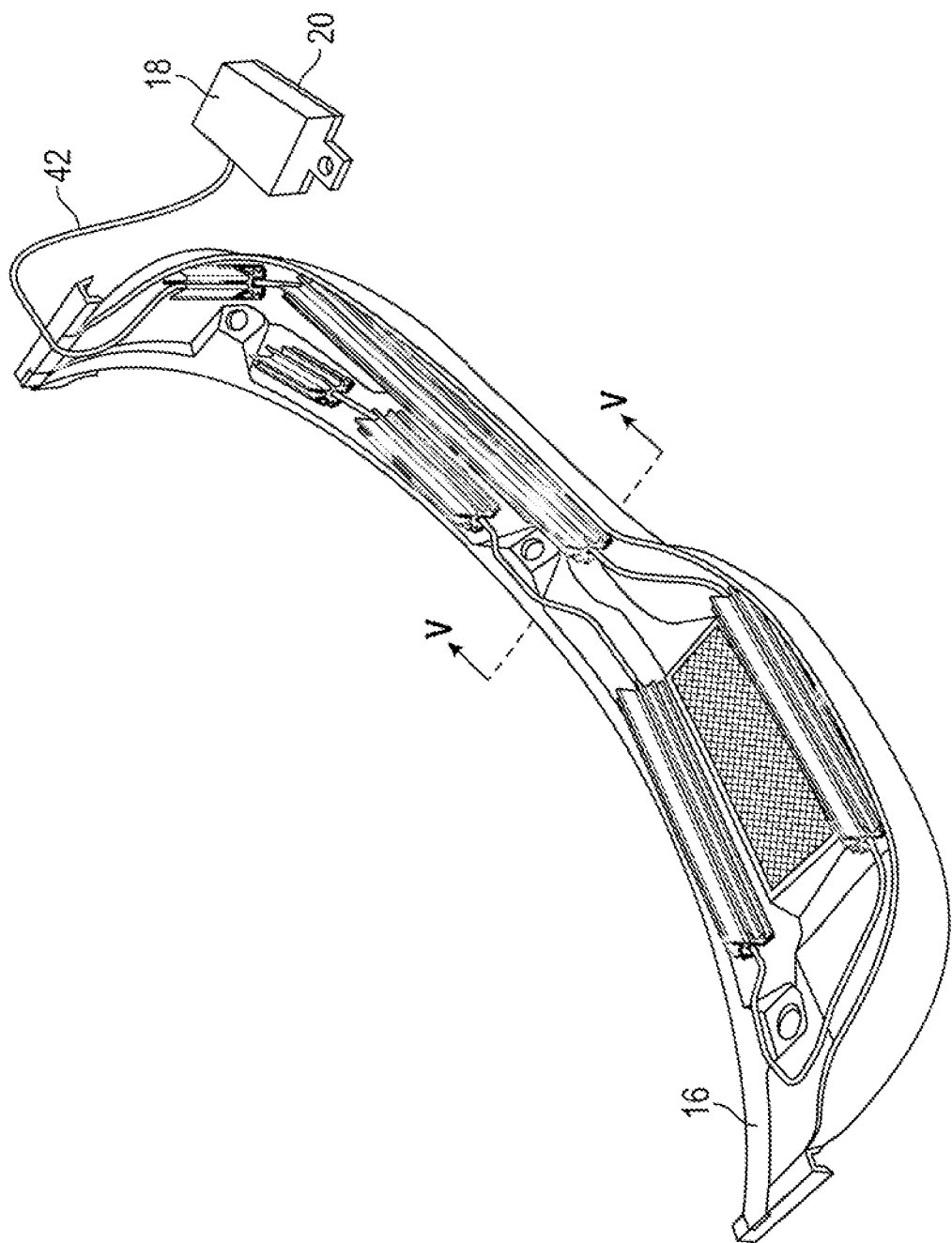
FIG. 2B shows components of an alternative wiper blade system.
Figure 5:
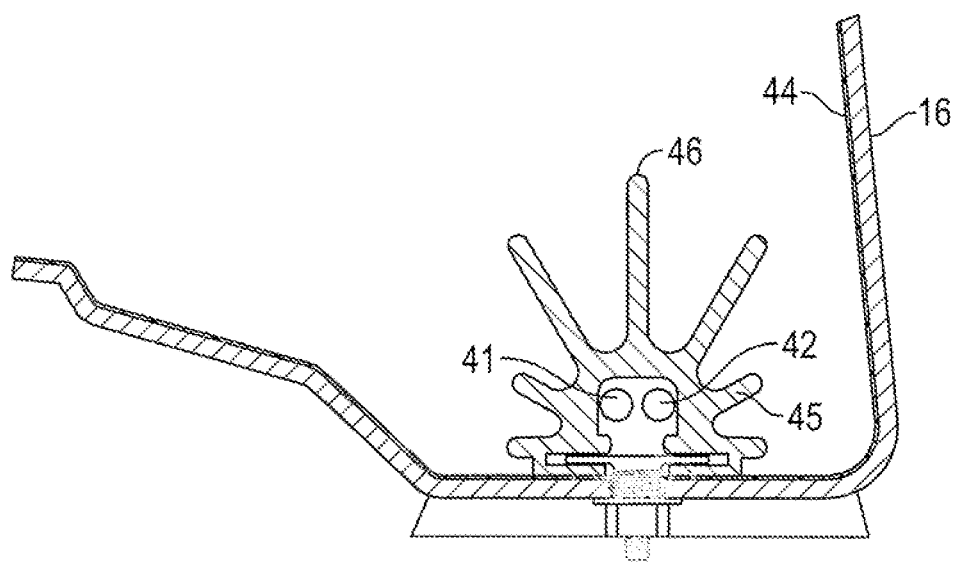
FIG. 5 is a cross-sectional view of a heated cowl.

Referring to FIGS. 1, 2 and 5, cowl 16 is near a windshield 40 and includes heating element 42 (e.g., a cable) and a heat reflector 44 to work synergistically with heated wiper blade assembly 21. Heat reflector 44 can be a metal cowl liner, such as an extruded aluminum part that conforms with, and is nested in cowl 16. Heating element 42 can be made of the same or different material as heating element 22 and/or housing 28. In one example, an electrical heating element 42 is copper combined with thermoplastics. Such heating element is commercially available in the form of a cable from Backer of USA in Chicago, Ill. Heating element 42 can be fixed in cowl 16 using fasteners, including adhesives or mechanical fasteners. Such fasteners may be thermally insulative and able to withstand high temperatures without deformation.

Figure 6:
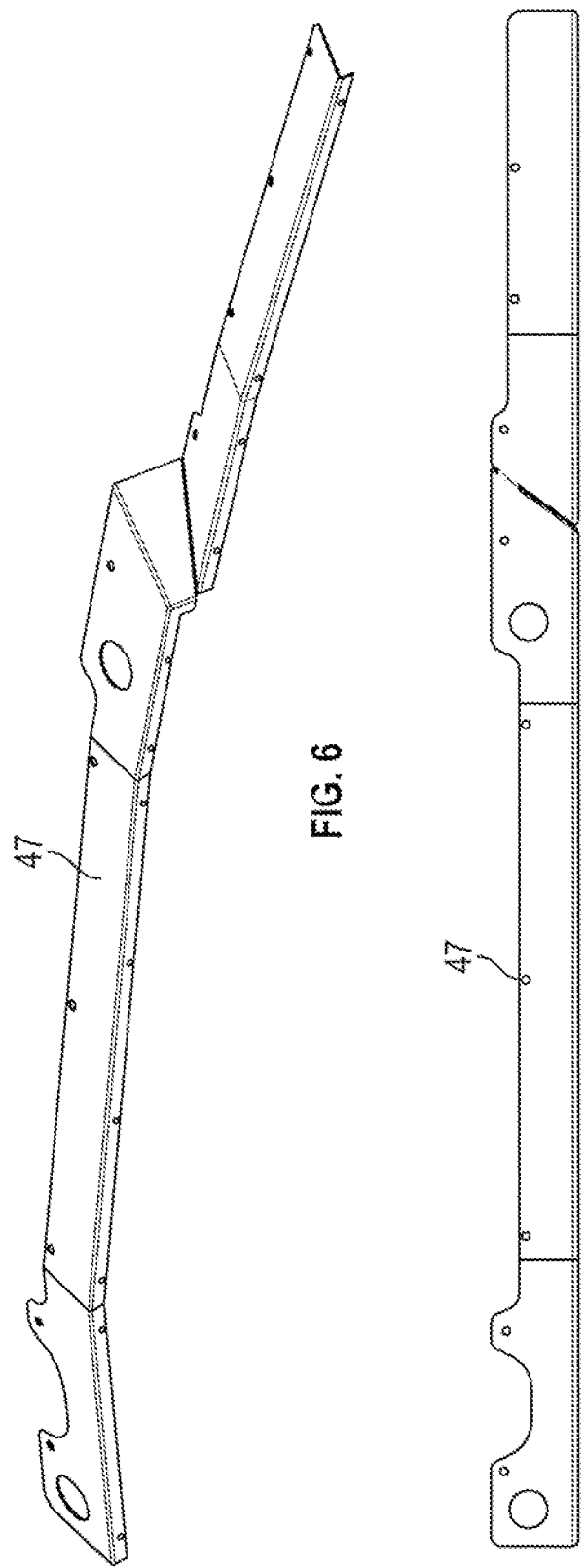
FIG. 6 is a perspective view of a cowl heat sink.
Figure 7:
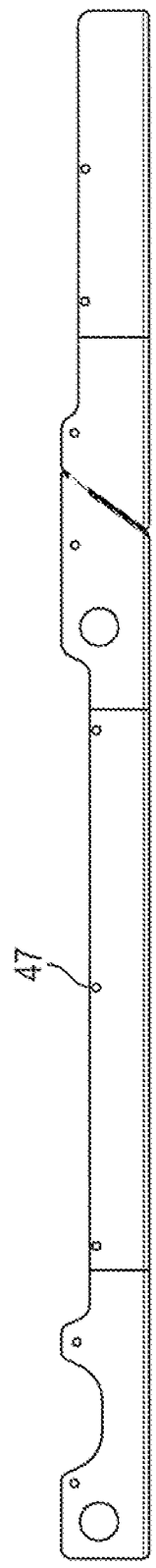
FIG. 7 is a top view of the cowl heat sink shown in FIG. 6.

An electrical heating element 42 is positioned through heat reflector 44 to distribute the heat in a desired manner. Other configurations are contemplated. Heat reflector 44 can take on any number of shapes. As exemplified in FIG. 2A, disposed within heat reflector 44 is a thermoplastic ribbon 43 (e.g., TPE ribbon) having at least one embedded heating element or wire and at least one embedded temperature sensor (e.g., a thermistor or thermocouples). In an alternative embodiment (FIG. 2B), a heating element 41 (or cable) and temperature sensor 42 are disposed within a channel of a thermal radiator 45 having a number of fingers 46 protruding outwardly to heat cowl 16 and nearby structures. Other shapes for optimizing the spread of the heat efficiently and effectively are contemplated. Heat reflector 44 may be made from various materials. By way of non-limiting example, heat reflector 44 may be made from aluminum, thermally conductive plastics, stainless steel and combinations thereof. Heat reflector 44 may endure temperatures as high as 300° F. or 149° F. without any substantial melting or deformation. A heat sink 47 (FIGS. 6 and 7) made of a highly conductive material such as aluminum can be positioned between ribbon 43 and reflector 44 to aid in uniformly distributing heat along cowl 16.

The wiper blade and the cowl apparatus are in electrical communication with a controller 18 and a power source. The controller may optionally include computer readable storage media for storing data representing instructions executable by one or more processors or microprocessors. Computer readable storage media may include one or more of random access memory as well as various non-volatile memory such as read-only memory or keep-alive memory. Computer readable storage media may communicate with a microprocessor and input/output circuitry via a standard control/address bus. As would be appreciated by one of ordinary skill in the art, computer readable storage media may include various types of physical devices for temporary and/or persistent storage of data. Exemplary physical devices include but are not limited to DRAM, PROMS, EPROMS, EEPROMS, and flash memory. Controller 18 can be, and is preferably, designed to use relays to control current to the heating elements 22, 42, and preferably employs solid state components.

Controller 18 is configured to receive input from one or more sensors regarding ambient temperature and may also receive input regarding whether the engine is running, along with other input such as wiper blade temperature. By way of non-limiting example, controller 18 may be programmed such that, when it receives data indicating threshold initiation criteria are met, the controller causes power from power source 46 to be directed to one or more of the heating elements 22, 42. Such initiation criteria may include temperature at or below a certain temperature (such as, for example 5° C.) in combination with indicators whether the engine is running such as data indicating the crank shaft position or voltage greater than 13 V. Exemplary alternative indicators of a running engine or operating vehicle may also include input from tachometer, vibration sensors accelerometer, a Hall effect sensors or combinations thereof.

Figure 8:
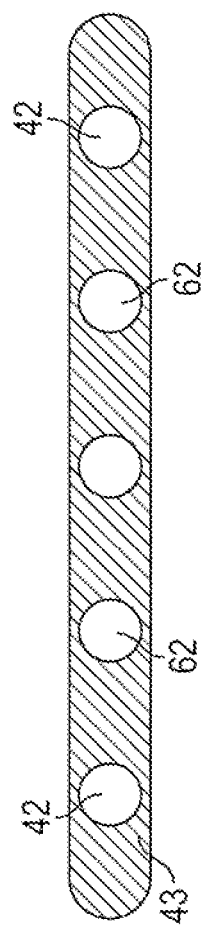
FIG. 8 is a cross-sectional view of the ribbon heating element as viewed along lines VIII-VIII of FIG. 2A.

Controller 18 may be programmed such that, when it receives data indicating threshold reduction criteria are met, the controller causes power from power source 46 to be reduced with respect to one or more of the heating element 22 of the wiper blade and the heating element 42 of cowl 16. Such reduction reduces energy consumption and prevents overheating and deterioration of heated components. Reduction criteria may include voltage drop and movement. Exemplary reduction criteria may also include a reduction in vibration, an increase in ambient temperature an increase in wiper blade assembly and/or cowl, temperature, or combinations thereof. Temperature sensors may be employed to detect ambient, wiper assembly and cowl temperatures. For example, an ambient air temperature sensor 60 can be located in the engine compartment away from heat generating or heat radiating sources to measure the outside air temperature. Ribbon 43 (shown in cross-section in FIG. 8, as viewed along arrows VIII in FIG. 2A) can have a plurality of heating elements and one or more wires 62 that terminate at a temperature sensor (e.g., thermistor or thermocouple). Similarly, housing 28 can contain a temperature sensor 64.

Controller 18 may be programmed such that, when it receives data indicating threshold stoppage criteria are met, the controller causes power from the power source to be stopped with respect to one or more of heating element 22, 42. Such stoppage criteria may include voltage drop and movement. Exemplary stoppage criteria may also include a halt in vibration, a high ambient temperature, a high wiper blade temperature, or combinations thereof.

Manual overrides to one or more of the initiation, reduction or stoppage threshold may be included in the system. Option sensors that may provide input to the controller include sensors that determine if the engine is running, ambient temperature and wiper blade temperature.

The combined system, with heated blades and a heated cowl aided by one or more component comprising a thermally conductive plastic, provides a surprisingly advantageous result in that it is effective at melting and clearing ice and snow with a lower than expected pull on a power source such as a primary automotive battery or an auxiliary battery. In an embodiment where the housing of a wiper blade is made form thermally conductive material, heating efficiency is expected to improve by over 10%. In certain embodiments, the housing of the wiper blade heats to about 45° C.

By using a combination of inputs to detect when an engine is running as opposed to using voltage increase alone, a surprising and unexpected increase in accuracy of when a heated wiper blade system should automatically turn on and off is achieved. Many commercial vehicles have accessories such as snow plows, cabin heaters, and other components that can cause a voltage drop when activated. This voltage drop can cause the controller to shut off as it creates the same effect as when the engine is not running. By using a combination of inputs, the accuracy of the system is surprisingly increased. An example of this is to use voltage in conjunction with an accelerometer. When the voltage drops, the input from the accelerometer will still detect the vehicle is moving and the controller will continue to operate.

Regarding the processes described hereto, it should be understood that, although the steps of such processes have been described as occurring m a certain sequence, such processes could be practiced with the described steps performed in an order other than the exemplary order. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined with reference to the appended claims along with the full scope of equivalents to which such claims are entitled. It is anticipated and intended that future developments will occur, and that the disclosed systems and methods will be incorporated into such future embodiments. In summary, it should be understood that the invention is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary.

What is claimed is:

1. A windshield wiper system, comprising:
    a wiper assembly, the wiper assembly including a first heating element in electrical communication with a power source;
    a temperature sensor for detecting an ambient temperature;
    an engine status sensor system for detecting an at least two indicators of engine status from the group comprising crank shaft position, voltage, tachometer reading, vibration, accelerometer reading, and hall effect; and
    a controller for controlling a power supply from the power source to the heating element, wherein the controller is configured to receive input from the temperature sensor and the engine status sensor system and the controller controls the power supply in response to a set of sensed information, the set of sensed information including the ambient temperature and the at least two indicators of engine status.

2. The windshield wiper system of claim 1, wherein the heating element includes at least one of copper, aluminum, nichrome alloy, copper nickel alloy, ceramic, and polymers modified for thermal conductivity.

3. The windshield wiper system of claim 1, wherein the wiper assembly further includes a second heating element.

4. The windshield wiper system of claim 3, wherein the first and second heating elements are contained within a housing parallel to one another, each running substantially a length of the wiper assembly, and buttressing a squeegee.

5. The windshield wiper system of claim 1, configured for use with vehicle to vehicle systems or vehicle to infrastructure systems.

6. The windshield wiper system of claim 1, wherein the wiper assembly further includes a frame supporting a housing and a squeegee, the heating element being in conductive communication with the housing.

7. The windshield wiper system of claim 1, wherein a housing comprises a thermally conductive plastic.

8. The windshield wiper system of claim 1, wherein at least two of a housing, a squeegee, and a frame comprise a thermally conductive plastic.

9. The windshield wiper system of claim 1, wherein the set of sensed information further includes a wiper blade temperature detected by a wiper blade temperature sensor.

10. The windshield wiper system of claim 1, wherein the set of sensed information further includes a manual override input detected from a manual override sensor.

* * * * *